US012674537B2

(12) United States Patent (10) Patent No.: US 12,674,537 B2
Papaik et al. (45) Date of Patent: Jul. 7, 2026

(54) HOSE STOP

(71) Applicant: Reelcraft Industries, Inc., Columbia City, IN (US)

(72) Inventors: Michael Papaik, Columbia City, IN (US); Edward L. Walter, Columbia City, IN (US)

(73) Assignee: Reelcraft Industries, Inc., Columbia City, IN (US)

( * ) Notice: Subject to any disclaimer, the term of this patent is extended or adjusted under 35 U.S.C. 154(b) by 576 days.

(21) Appl. No.: 18/062,451

(22) Filed: Dec. 6, 2022

(65) Prior Publication Data

US 2023/0175628 A1 Jun. 8, 2023

Related U.S. Application Data

(60) Provisional application No. 63/265,055, filed on Dec. 7, 2021.

(51) Int. Cl.
*F16L 55/00* (2006.01)
*F16L 5/00* (2006.01)

(52) U.S. Cl.
CPC ................ *F16L 55/00* (2013.01); *F16L 5/00* (2013.01)

(58) Field of Classification Search
CPC ........ F16L 55/00; F16L 5/00; B65H 75/4426; Y10T 24/45969; Y10T 24/3916; A01K 93/00
USPC ............................. 242/390.1; 43/44.9, 44.91
See application file for complete search history.

(56) References Cited

U.S. PATENT DOCUMENTS

| | | | | |
|---|---|---|---|---|
| 231,417 | A | * | 8/1880 | Foote ..................... A01K 93/00 |
| | | | | 24/114.5 |
| 541,789 | A | * | 6/1895 | Kunzelman ............ A01K 93/00 |
| | | | | 43/43.11 |
| 971,420 | A | * | 9/1910 | Tannert ..................... A63H 1/00 |
| | | | | 446/261 |
| 1,193,912 | A | * | 8/1916 | Maire et al. ........... A01K 93/00 |
| | | | | 43/43.15 |
| 2,174,192 | A | | 9/1939 | Meighan |
| 2,193,236 | A | | 3/1940 | Meighan |
| 2,242,533 | A | | 5/1941 | Meighan |
| 2,599,973 | A | * | 6/1952 | Bujaky .................. A01K 95/00 |
| | | | | 43/44.9 |
| 3,701,212 | A | * | 10/1972 | Gilliam .................. A01K 95/00 |
| | | | | 43/44.87 |
| 4,290,173 | A | | 9/1981 | Herlau |
| 4,930,193 | A | | 6/1990 | Baker |
| 5,165,195 | A | * | 11/1992 | Matsui .................... A01K 93/00 |
| | | | | 43/44.9 |
| 5,388,368 | A | * | 2/1995 | Lawrence .............. A01K 91/03 |
| | | | | 43/44.9 |

(Continued)

FOREIGN PATENT DOCUMENTS

| | | |
|---|---|---|
| GB | 924609 A | 4/1963 |
| GB | 1537329 A | 12/1978 |

OTHER PUBLICATIONS

Wayback machine screenshot of Earthquake XT 3/8 in. x 50 ft. Industrial Grade Air Hose Reel, dated to 2020 (Year: 2025).*

*Primary Examiner* — Kenneth Rinehart
*Assistant Examiner* — Haotian Lu
(74) *Attorney, Agent, or Firm* — Vedder Price P.C.

(57) ABSTRACT

A hose stop and associated assemblies and methods. The hose stop is configured for being mounted on a flexible hose through the deformation of the hose and subsequent reduction of the deformation.

20 Claims, 10 Drawing Sheets

(56) References Cited

U.S. PATENT DOCUMENTS

| | | | |
|---|---|---|---|
| 5,829,105 A | 11/1998 | Matoba et al. | |
| 6,044,527 A | 4/2000 | Ishida et al. | |
| 7,877,924 B2 * | 2/2011 | Schoenike | A01K 93/00 |
| | | | 43/43.1 |
| 2004/0148742 A1 | 8/2004 | Berns | |

* cited by examiner

HOSE STOP

FIELD

The present disclosure generally relates to hoses which can be spooled on reels and, more particularly, to a hose stop device that can be installed on a hose to prevent the hose from fully spooling without requiring the assembly of multiple parts.

BACKGROUND

The use of hose stops on hoses is a well-known practice that has a variety of benefits, combining the organizational advantages of storing a hose on a reel with the practical advantages of leaving available an end of the hose for ready access. However, the installation and use of hose stop assemblies can present certain challenges, such as the gradual slipping of a hose stop, which may require disassembly and reassembly of multiple parts for proper repositioning.

BRIEF SUMMARY

In one aspect of the present invention, a stop is configured to be mounted on a flexible hose to limit the range of travel of the flexible hose toward a hose reel or a comparable apparatus that can extend and retract the flexible hose. The stop has a body that is formed as one piece of material. The stop is constructed so it can be mounted on the flexible hose by receiving the hose via the deformation of the flexible hose and subsequent reduction of the deformation. In other embodiments, a stop assembly may include the stop and a bumper that is configured to constrain the movement of the stop in at least one direction.

In another aspect of the present invention, a method of mounting a stop on a flexible hose comprises directing a first portion of the hose through a first transverse channel of the stop. The stop includes a second transverse channel that is offset circumferentially of the first transverse channel by an amount other than 180°. The second portion of the hose is directed through the second transverse channel.

In still another aspect of the present invention, an alternative stop includes a body with a hose passage formed therein. The hose passage has a first transverse channel and a second transverse channel. The first and second transverse channels are circumferentially offset from each other by an amount other than 180°.

Other objects and features will be in part apparent and in part pointed out hereinafter.

BRIEF DESCRIPTION OF THE SEVERAL VIEWS OF THE DRAWING

Corresponding reference characters indicate corresponding parts throughout the drawings.

DETAILED DESCRIPTION

Figure 1:
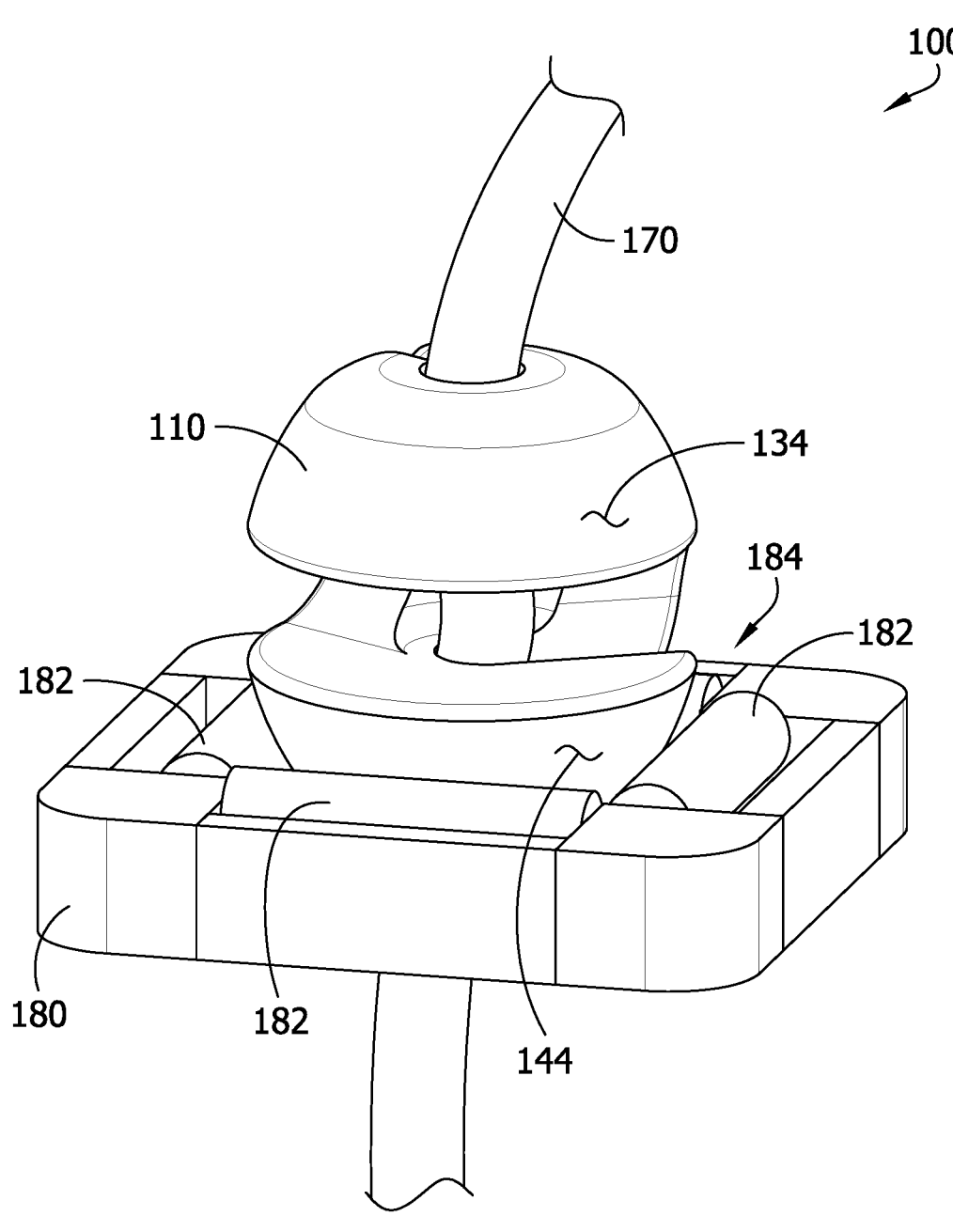
FIG. 1 is a perspective of an embodiment of a hose stop assembly.
Figure 2:
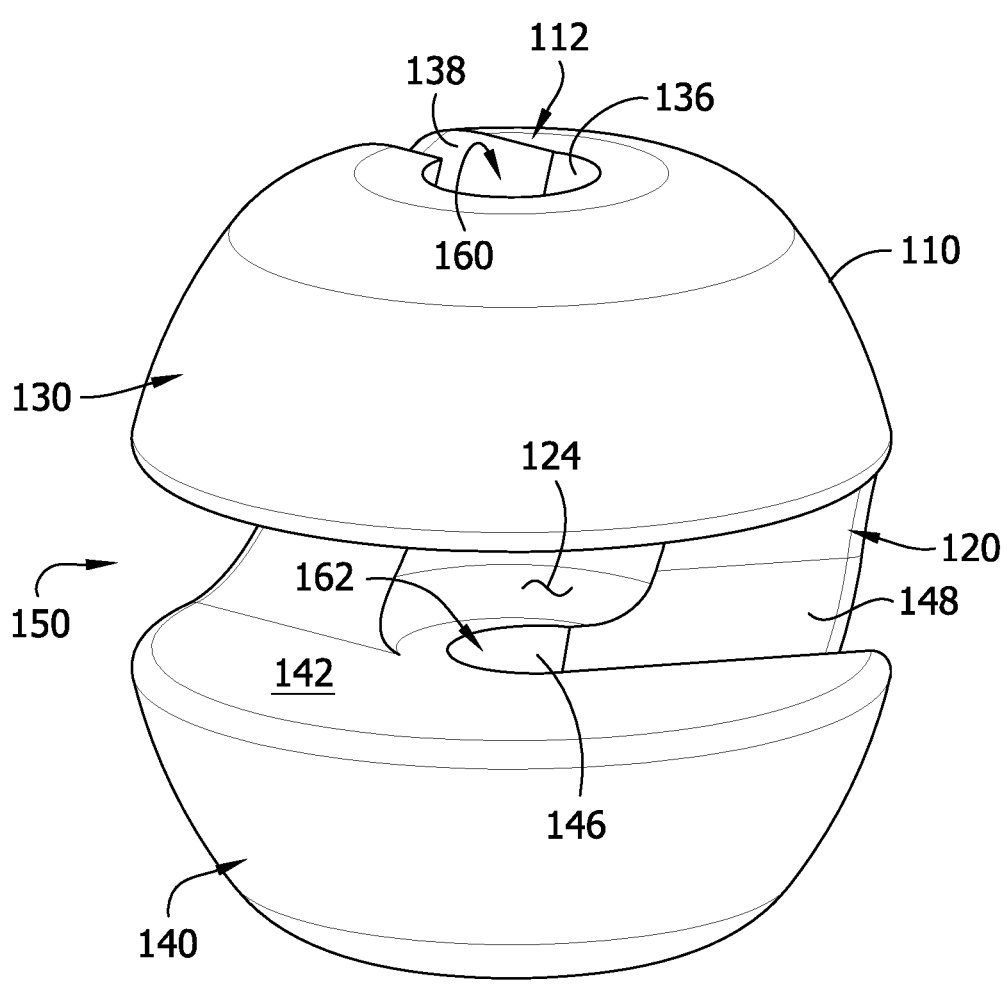
FIG. 2 is perspective of the hose stop from the assembly of FIG. 1.

A hose stop assembly of the present disclosure is indicated generally by the reference number 100 in FIG. 1. The hose stop assembly 100 includes a hose stop 110, a hose 170, and a bumper assembly 180. It is contemplated that a lower portion of the hose 170 may be wound onto a reel or spool (not shown) that allows a user to extend and retract the hose 170 to a desired length for improved use and storage. As will be described in greater detail herein, the hose stop 110 is configured to be removably mounted on the hose 170 such that the hose may move in conjunction with the hose stop without substantially blocking or otherwise inhibiting the passage of fluids being transported through the hose 170 (e.g., pressurized air for vehicle tires, not shown). Although the illustrated embodiment pertains to a flexible hose, the stop will also work on other retracted items, including without limitation, cables, rope and cord. It will be understood that as used in this writing and specifically in the claims "hose" is to be construed broadly to cover any item capable of being wound up on a reel. As will be described in greater detail herein, the bumper assembly 180 is generally configured to facilitate the extension and retraction of the hose 170 and to prevent the hose from being retracted beyond the position where the hose stop 110 is mounted on the hose.

Referring now to FIGS. 2-5, the hose stop 110 has a generally ellipsoidal body with truncated ends 112 and 114 that are located on the top and bottom of the body, respectively. The hose stop 110 has a central portion 120, an upper portion 130, and a lower portion 140. In the illustrated embodiment, the central, upper, and lower portions 120, 130, 140 of the hose stop 110 are integrally formed (i.e., formed as one piece of material), though it is contemplated that in other embodiments the hose stop may be made of several discrete sections that are joined together. The hose stop 110 can be formed from a sturdy, durable material such as a thermoplastic resin that is preferably weather-resistant and UV-resistant. As will be described in greater detail herein, the interior surfaces of the central, upper, and lower portions 120, 130, 140 cooperate to define a hose passage 150 that is configured to receive and selectively retain the hose 170 within the hose stop 110 during use of the hose stop assembly 100. The hose passage 150 is defined by a receiving channel 152, a first (or upper) transverse channel 154, a second (or lower) transverse channel 156, a first (or upper) retaining channel 160, and a second (or lower) retaining channel 162, as will be described in greater detail herein.

Figure 3:
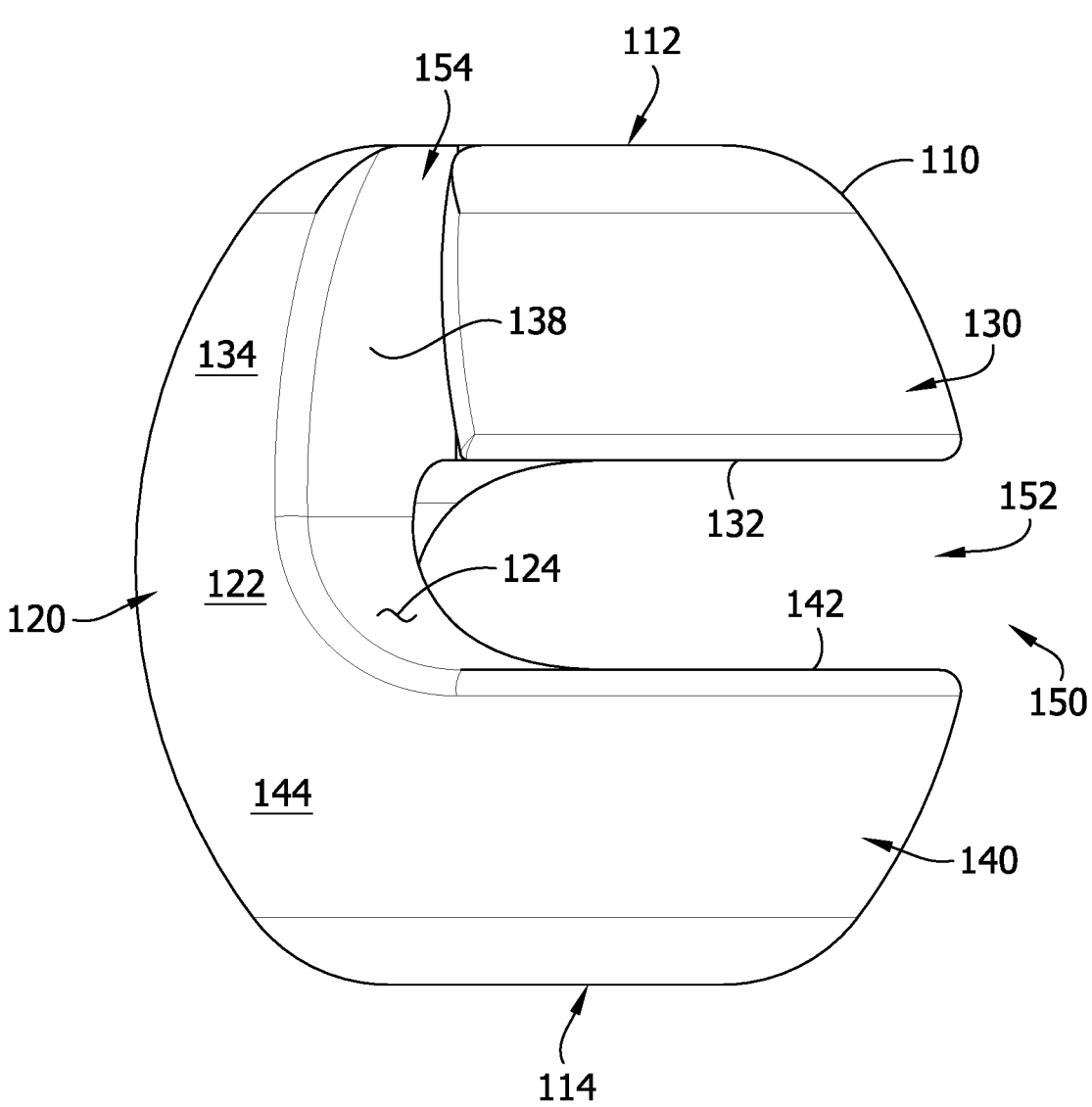
FIG. 3 is a side elevation thereof.
Figure 4:
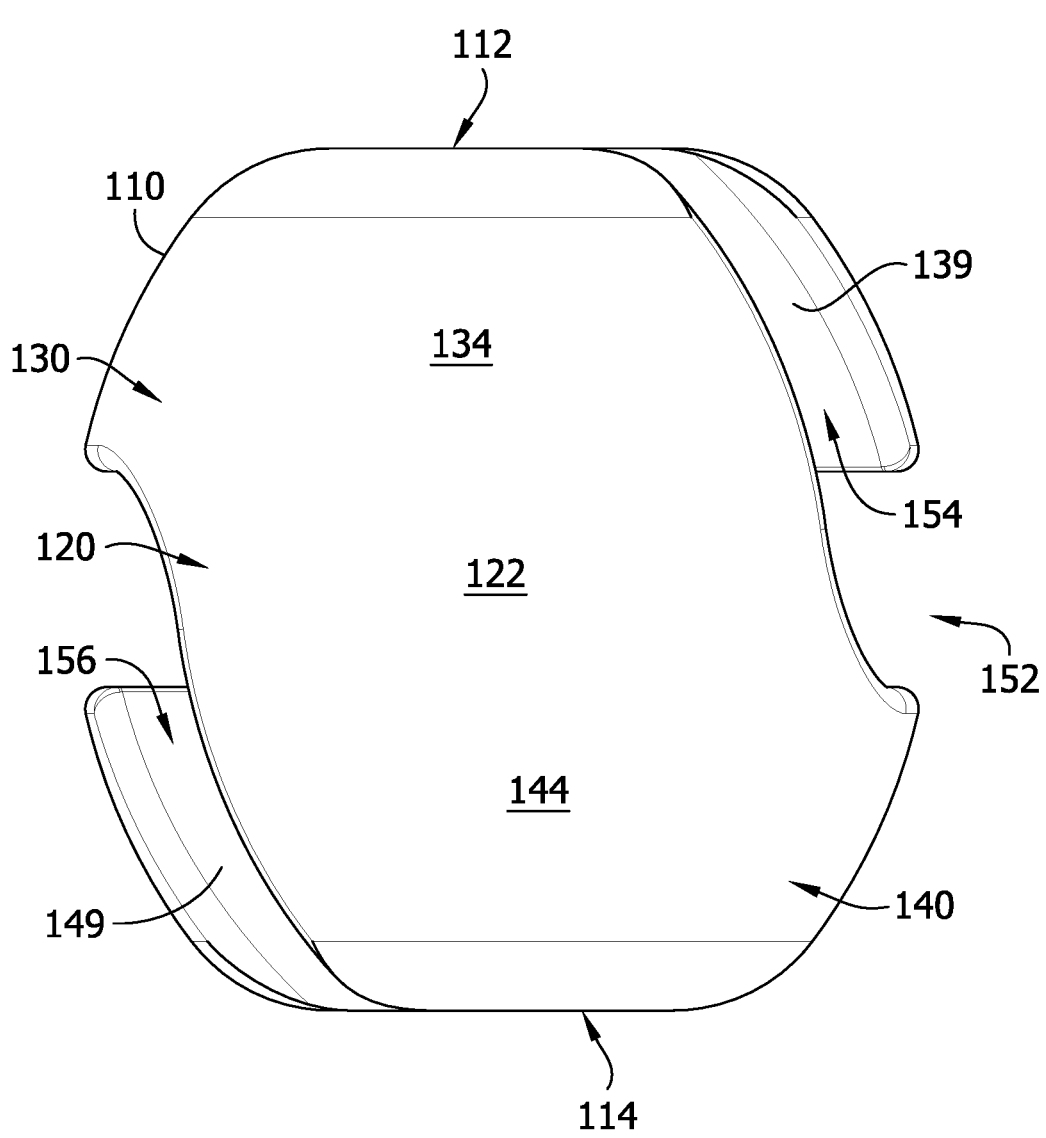
FIG. 4 is a rear elevation thereof.
Figure 5:
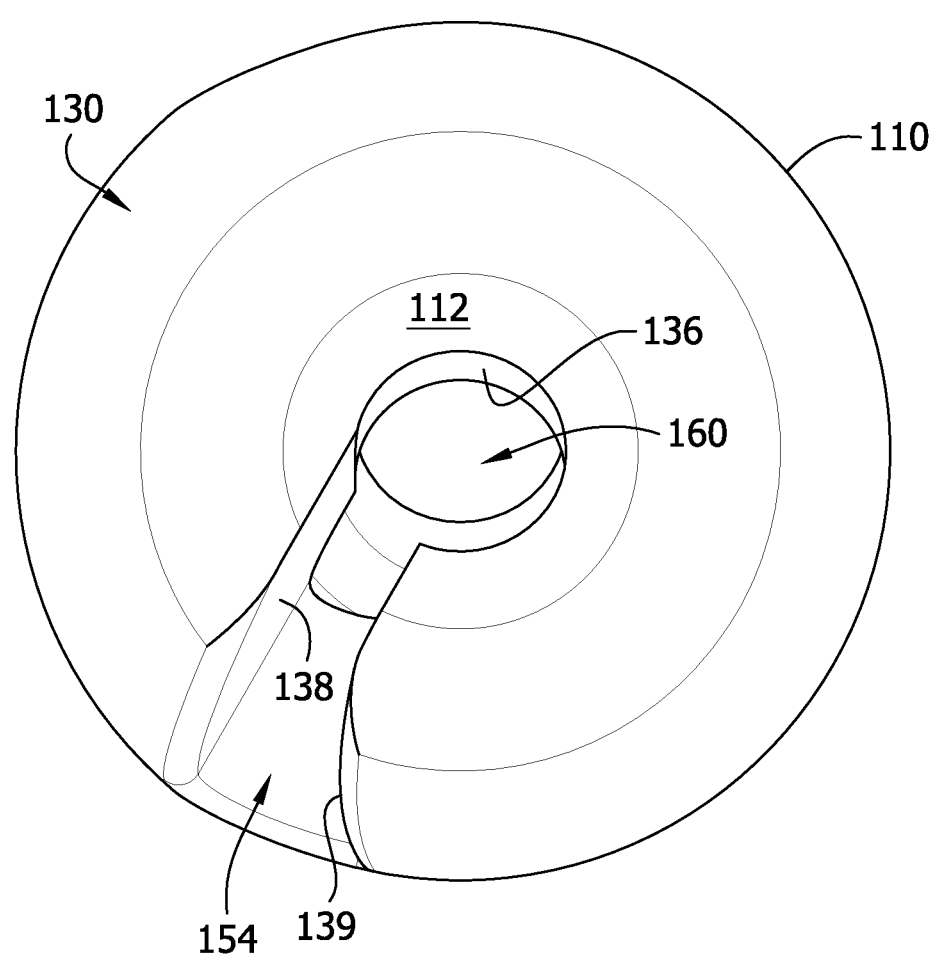
FIG. 5 is a plan thereof.
Figure 7A:
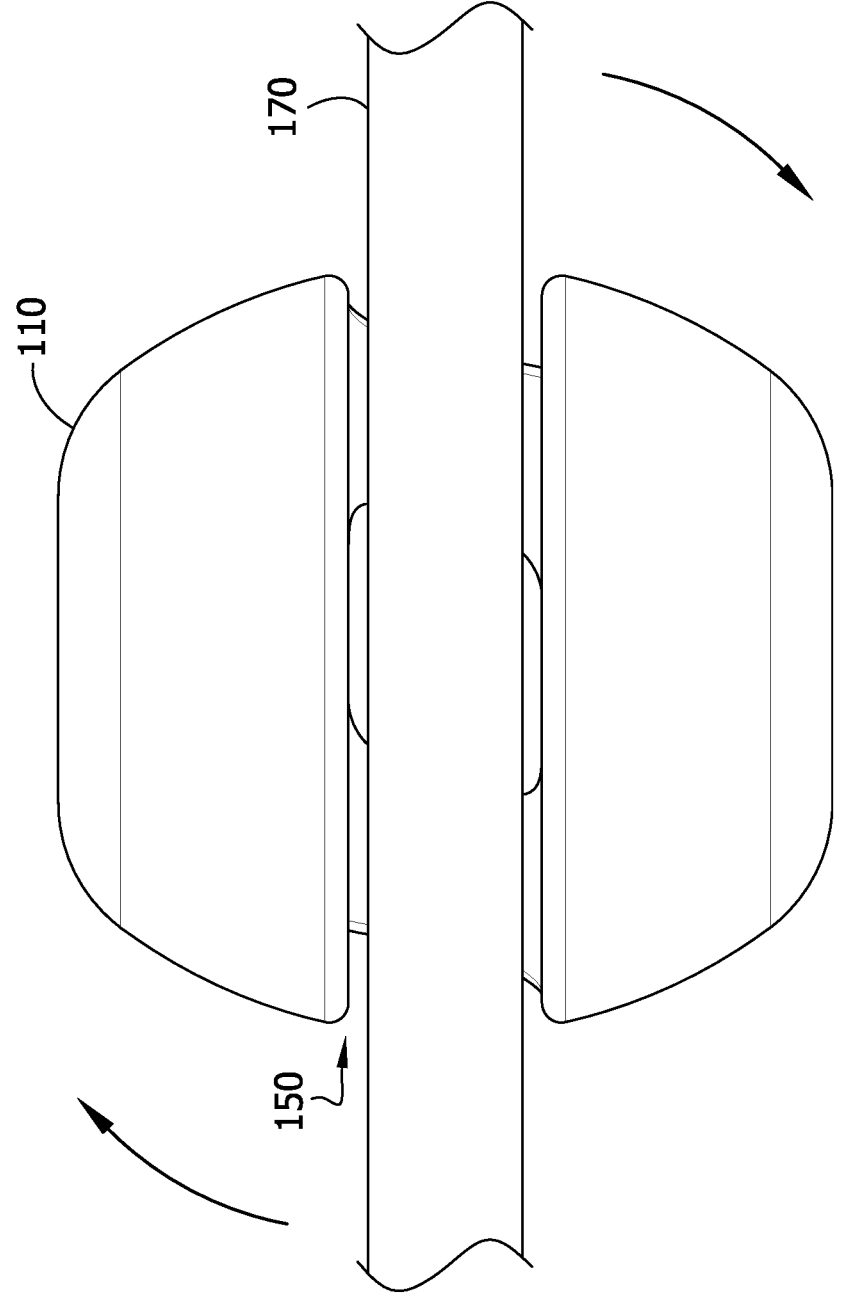
FIG. 7A is a front elevation thereof with the segment of the hose in the receiving orientation.
Figure 7B:
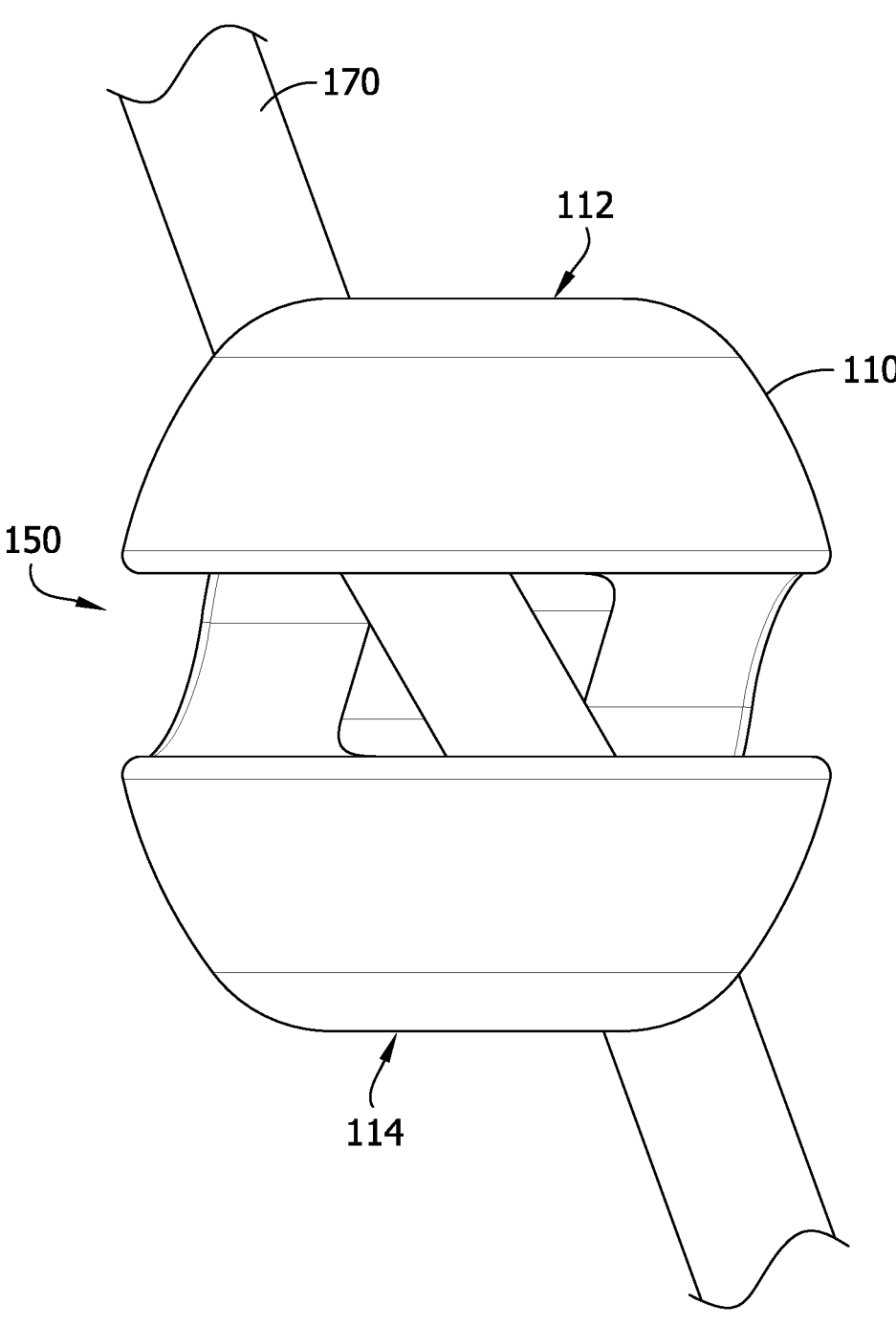
FIG. 7B is a front elevation thereof with the segment of the hose in a diagonal orientation.

Referring still to FIGS. 2-5, the upper portion 130 and the lower portion 140 are located on substantially opposite sides of the hose stop 110 (e.g., coincident with the top end 112 and the bottom end 114, respectively). The upper portion 130 has a partially dome-shaped structure that includes a lower part 132, an upper outer surface 134, an upper central wall 136, a first upper transverse wall 138, and a second upper transverse wall 139. As is best seen in FIGS. 3-5, the first and second upper transverse walls 138, 139 extend generally upward through the upper portion 130 to define the upper transverse channel 154. The upper transverse channel 154 communicates with the receiving channel 152 and the upper retaining channel 160. The second upper transverse wall 139 is oriented at an angle relative to the first upper transverse wall 138 such that the upper transverse channel 154 tapers gradually inward between the base 132 and the top end 112. Adjacent the lower part 132, the first and second upper transverse walls 138, 139 are separated by a distance approximately equal to the diameter of the hose 170 to facilitate the maneuvering of the hose upward through the upper transverse channel 154 (shown generally in FIGS. 7A-7B). As the first and second upper transverse walls 138, 139 approach the top end 112, the distance between the transverse walls narrows substantially (e.g., to approximately one half of the diameter of the hose 170), which requires a portion of the hose 170 to deform to fit through when the hose is maneuvered through the upper transverse channel 154. It is understood that the separation distance between the first and second upper transverse walls 138, 139 can vary depending on factors such as the flexibility of the hose 170 or the desired amount of resistance to oppose movement of the hose.

The upper central wall 136 extends between the lower part 132 and the top end 112. The upper central wall 136 is generally coincident with the first and second upper transverse walls 138, 139. The upper central wall 136 has a generally cylindrical shape that skews slightly relative to the vertical axis of the hose stop 110, with the cylindrical profile having a diameter that is preferably approximately equal to or slightly less than the outer diameter of the hose 170 to ensure the hose is securely received by the stop when the stop is fully mounted. Adjacent the lower part 132, the upper central wall 136 spans approximately half of the circumference of the cylindrical profile. Adjacent the top end 112, the upper central wall 136 spans approximately three fourths of the circumference of the cylindrical profile. The upper central wall 136 thus defines a partially cylindrical upper retaining channel 160 that opens through the top end 112 and communicates with the receiving channel 152 and the upper transverse channel 154. The upper retaining channel 160 can selectively retain a portion of the hose when the hose stop 110 is mounted on the hose 170, as will be described in greater detail herein. The varying span of the upper central wall 136 between the lower part 132 and the top end 112 generally corresponds to the narrowing of the upper transverse channel 154 and thus contributes to the deformation of the hose 170 as the hose is maneuvered through the upper transverse channel and into (or out of) the upper retaining channel 160. Once the hose 170 is fully received by the upper retaining channel 160, the deformation is at least somewhat relieved and the hose is securely retained in the upper retaining chamber until enough force is applied on the hose to cause the hose to deform and travel back into the upper transverse channel 154.

Referring again to FIGS. 2-5, the lower portion 140 of the hose stop 110 is substantially identical to the upper portion 130—it includes an upper part 142, a lower outer surface 144, a lower central wall 146, a first lower transverse wall 148, and a second lower transverse wall 149—but is generally in an inverted orientation (i.e., turned upside-down) relative to the upper portion. Accordingly, the first and second lower transverse walls 148, 149 define a lower transverse channel 156 that corresponds to the upper transverse channel 154, and the lower central wall 146 defines a lower retaining channel 162 that corresponds to the upper retaining channel 160. The upper transverse channel 154 is not located diametrically opposite the lower transverse channel 156 (i.e., offset by 180 degrees) but is instead rotationally offset from the lower transverse channel by an angle of less than 180 degrees—and preferably between 120 and 150 degrees—about a longitudinal (i.e., vertical) axis of the hose stop 110. The rotational offset between the upper transverse channel 154 and the lower transverse channel 156 requires the hose 170 to bend as the hose is maneuvered between its receiving position (shown generally in FIGS. 6B and 7A) and its mounted position (shown generally in FIGS. 8A-8B). It will further be appreciated that the upper retaining chamber 160 and the lower retaining chamber 162 are not completely aligned on the vertical axis of the hose stop 110 but skew in differing directions, as generally indicated by the orientation of the hose 170 in FIGS. 8A-8B.

Referring now to FIGS. 3-4, the central portion 120 of the hose stop 110 extends between the base 132 of the upper portion 130 and the base 142 of the lower portion 140 on a rear side of the hose stop. The central portion 120 has an outer central surface 122 that is continuous with the outer surfaces 134, 144, as well as an inner central surface 124 located generally within the hose stop 110 between the upper portion 130 and lower portion 140. As is best seen in FIG. 4, the central portion 120 is generally aligned with the upper transverse channel 154 and the lower transverse channel 156. Referring again to FIGS. 2-4, the upper and upper parts 132, 142 and the inner central surface 124 define a receiving channel 152 that extends horizontally across a majority of the middle of the hose stop 110. The receiving channel 152 communicates with the upper and lower transverse channels 154, 156 above and the upper and lower retaining chambers 160, 162 below to establish the hose passage 150. The receiving channel 152 is wide enough to receive the hose 170 without creating resistance or deformation, as shown generally in FIGS. 6A-6B.

Referring again to FIG. 1, the bumper assembly 180 functions as a bumper for the hose stop and includes four rollers 182 (generally, bumpers) arranged in a rectangular configuration to define a roller passage 184. The roller passage 184 is wide enough to receive the hose 170 but is narrower than the hose stop 110. When the hose stop assembly 100 is fully assembled, the hose 170 passes through the roller passage 184, and the hose stop 110 is mounted on the hose 170 at a location generally beyond the top of the bumper assembly 180, nearer to the free end of the hose. When the hose stop 110 is mounted on the hose 170, the rollers 182 prevent the hose from retracting beyond the location where the hose stop is mounted. Specifically, the rollers 182 contact the lower outer surface 144 of the hose stop 110 and inhibit travel through the roller passage 184. In an embodiment where the hose stop 110 is mounted upside-down on the hose 170 (i.e., with the upper portion 130 facing the bumper assembly 180), the rollers 182 would contact the upper outer surface 134 in the same manner.

In some embodiments, the hose stop assembly 100 may be used with a spring-loaded reel or another apparatus (not shown) that is configured to retract the hose 170 manually or automatically (with all such devices being considered a "hose reel" for purposes of this disclosure). Although the hose stop 110 is generally configured to provide a consistent stopping point for the hose 170 when the hose is retracted, the mounting position of the hose stop can be adjusted by disengaging the stop from the hose, moving the stop to a new location relative to the hose, and re-mounting the stop on the hose. For example, the user may adjust the relative position of the hose stop 110 to make sure the hose maintains a minimum distance even when retracted and/or to compensate for gradual slippage over time. Due to the unitary design of the hose stop 110, the user may adjust the position of the stop relatively quickly and effortlessly, without the need to assemble or disassemble additional elements like a collar.

Figures 6A, 6B:
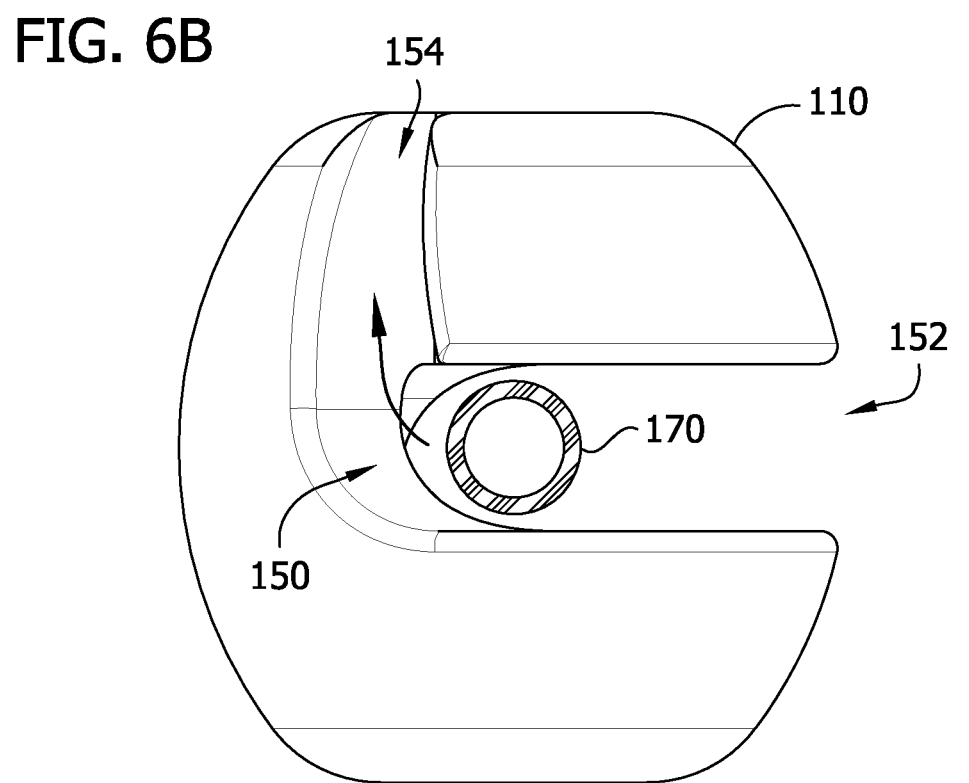
FIG. 6A is a side elevation of the hose stop and a segment of the hose from the assembly of FIG. 1 with the segment of the hose located outside the hose stop.
FIG. 6B is a side elevation thereof with the segment of the hose in a receiving orientation.
Figure 8A:
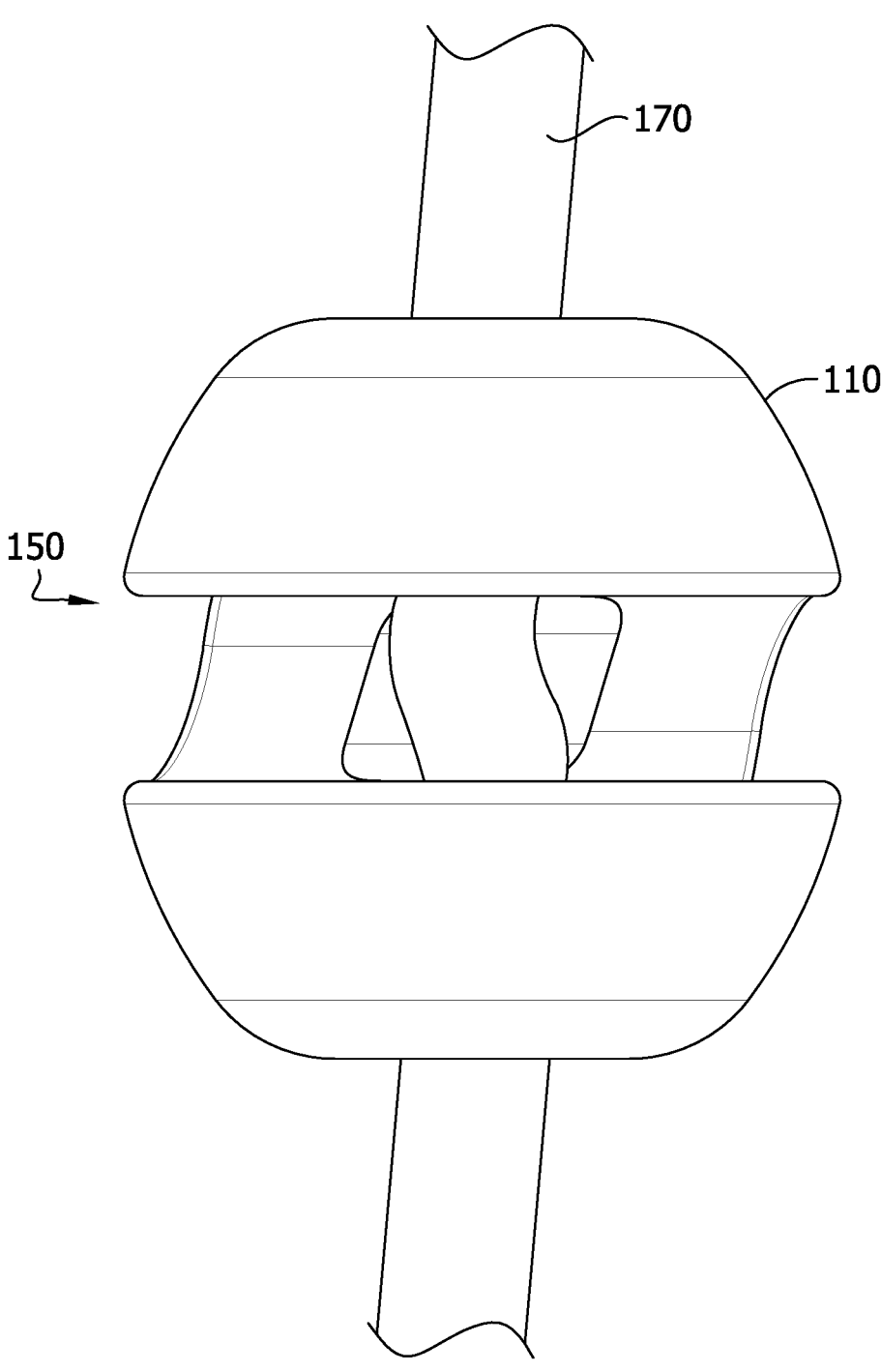
FIG. 8A is a front elevation thereof with the segment of the hose in a mounted position.
Figure 8B:
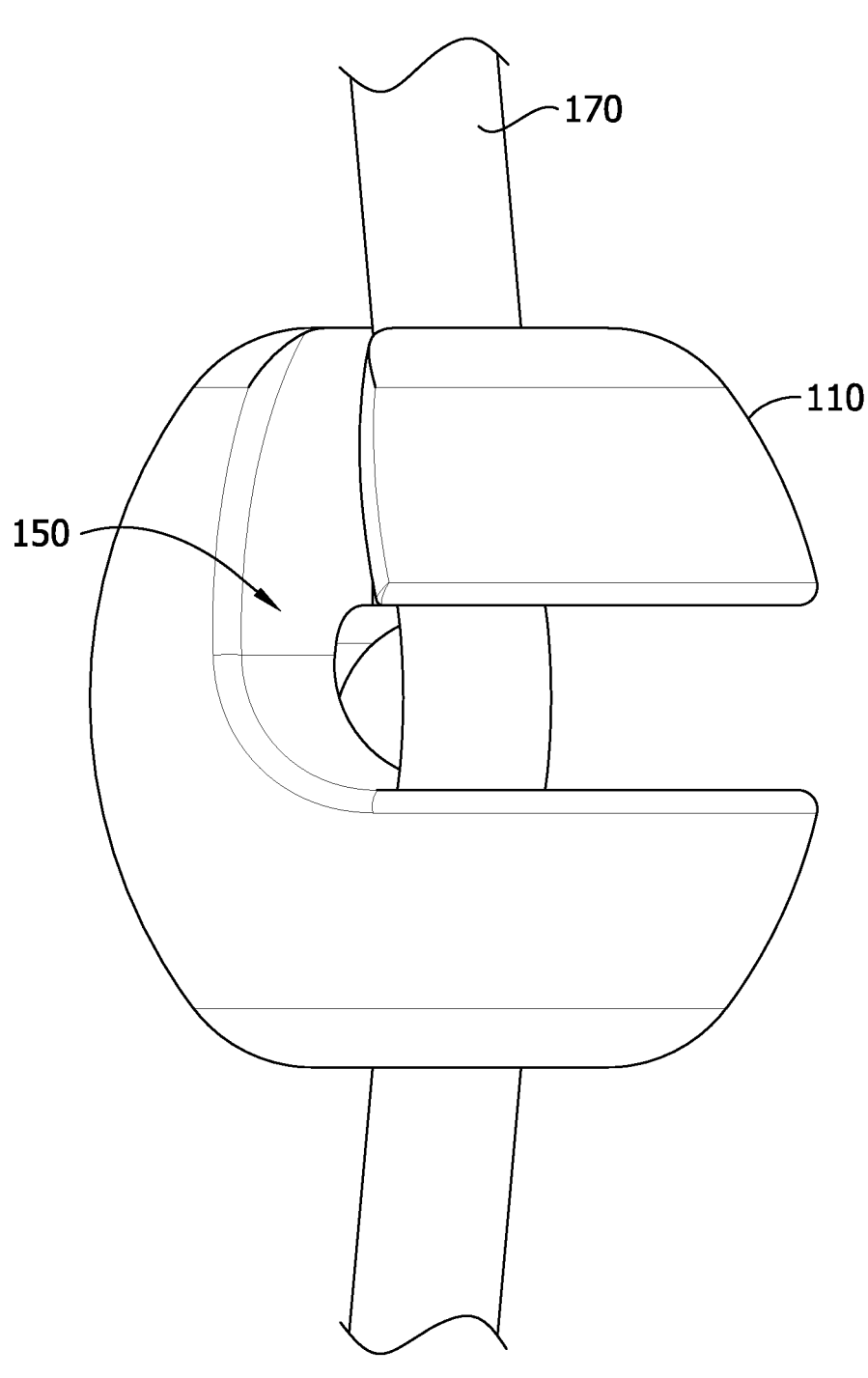
FIG. 8B is a side elevation thereof with the segment of the hose in the mounted position.

Referring now to FIGS. 6A-8B, the hose stop 110 may be removably mounted on the hose 170 in the following manner. As shown in FIGS. 6A-6B, the user may orient the hose stop 110 in a receiving position (e.g., horizontal) relative to the hose 170, and insert the hose in the receiving channel 152 of the stop. As described herein the hose stop 110 is shaped and arranged to take advantage of the elastic memory of the hose 170. Although the hose is flexible, it is also somewhat resilient (especially with smaller bends). The elastic memory relates both to bending of the hose 170, but also to any diametrical deformation. As shown in FIGS. 7A-7B, the user may direct a first portion of the hose 170 diagonally through the upper transverse channel 154 and generally toward the upper retaining channel 160. The user may direct a second portion of the hose diagonally through the lower transverse channel 156 and generally toward the lower retaining channel 162. In order to pass through the respective transverse channels 154, 156, the hose must deform to approximately half its diameter near the top end 112 and bottom end 114. As shown in FIGS. 8A-8B, the first and second portions of the hose 170 may then be directed into the upper retaining channel 160 and the lower retaining channel 162, respectively, at which point the hose is oriented in a mounted position relative to the hose stop 110 (e.g., substantially vertical) and the deformations in the respective portions of the hose 170 are reduced. It will be appreciated that the first and second portions of the hose 170 may be directed through the hose passage 150 in the above manner either simultaneously or sequentially. Further, the hose stop 110 may be disconnected from the hose 170 following the above steps in generally the reverse direction and order.

Referring to FIGS. 8A-8B, when the hose stop 110 is mounted on the hose 170, static friction between the hose and the stop prevents the hose 170 from sliding substantially relative to the stop when a load is applied, as may occur when the bumper assembly 180 impacts the hose stop upon retraction of the hose. As is further seen in FIGS. 8A-8B, the hose 170 bends slightly when the hose is in its retained orientation due to the skewed positioning of the upper retaining channel 160 and the lower retaining channel 162 as previously described in connection with FIGS. 2-5. The slight bend in the hose 170 provides additional resistance against sliding but does not substantially interrupt the passage of fluids (e.g., compressed air or water) transported through the hose during general use. The hose 170 (due to elastic memory) wants to straighten out and so bears against the hose stop 110 internally, helping to hold the host stop in place.

It is understood that the size of hoses may vary depending on numerous parameters, including desired flow rates, durability, compactness, etc., and it is further understood that other, similar objects (e.g., cables, ropes, cords) can alternatively be used with the invention described herein without affecting the general use of the invention. Thus, the term "hose" should be understood as any type of object that is generally compatible with the hose stop 110. To the extent that the description herein discloses or suggests a particular diameter of hose in relation to an aspect of the present invention, this is intended only as an example and not as a limitation.

Having described the invention in detail, it will be apparent that modifications and variations are possible without departing from the scope of the invention defined in the appended claims. By way of example only, an alternative embodiment could have a spherical or rectangular body structure, or an alternative embodiment could have a hose passage with channels that are oriented at different angles relative to the hose stop shown in FIGS. 2-5 without deviating from the invention disclosed in this description. Further, orientation terms like "vertical," "horizontal," "upper" and "lower" are used for convenience of description and do not require a particular orientation of the hose stop.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above without departing from the scope of the invention, it is intended that all matter contained in the above description and shown in the accompanying drawings shall be interpreted as illustrative and not in a limiting sense.

The invention claimed is:

1. A stop configured for mounting on a flexible hose for use in limiting travel of the hose into a hose reel, the stop comprising; a body formed as one piece of material and constructed for mounting onto the hose with deformation of the hose so that the stop is retained on the hose after the deformation is reduced, wherein the body has a hose passage formed therein defined by a first retaining channel, a receiving channel and a second retaining channel, wherein the hose passage across the receiving channel is aligned about a longitudinal axis of the stop, the first retaining channel is aligned about the longitudinal axis of the stop at the receiving channel and extends therefrom to a top end to define a first skew angle relative to the longitudinal axis of the stop and the second retaining channel is aligned about the longitudinal axis of the stop at the receiving channel and extends therefrom to a bottom end to define a second skew angle relative to the longitudinal axis of the stop.

2. The stop as set forth in claim 1 wherein the hose passage comprising a first transverse channel and a second transverse channel, the first and second transverse channels being circumferentially offset from each other by an amount other than 180°.

3. The stop as set forth in claim 2, wherein the second transverse channel is rotationally offset from the first transverse channel about a longitudinal axis of the stop.

4. The stop as set forth in claim 2, wherein the first transverse channel communicates with the first retaining channel and the second transverse channel communicates with the second retaining channel;

wherein the deformation occurs as the hose is moved through the first and second transverse channels; and wherein the deformation is reduced as the hose is fully received in the first and second retaining channels.

5. The stop as set forth in claim 1, wherein the first skew angle is different than the second skew angle.

6. The stop as set forth in claim 4, wherein the receiving channel communicates with the first transverse channel and the first retaining channel generally in a first direction and the second transverse channel and the second retaining channel generally in a second direction opposite the first direction.

7

7. The stop as set forth in claim 6, wherein the first retaining channel and the second retaining channel are oriented substantially perpendicular to the receiving channel.

8. The stop as set forth in claim 6, wherein the first retaining channel and the second retaining channel are oriented at skew angles relative to the receiving channel.

9. The stop as set forth in claim 6, wherein the receiving channel extends across a majority of a middle region of the body.

10. The stop as set forth in claim 6, wherein the receiving channel is wider than the hose.

11. A stop assembly comprising the stop of claim 1 and a flexible hose, wherein the hose passage is configured for receiving the hose and securing opposing portions of the hose in the first retaining channel and the second retaining channel, respectively.

12. The stop as set forth in claim 1, wherein the body is configured to engage a bumper.

13. A stop assembly comprising the stop of claim 1 and a bumper, the bumper being configured to constrain movement of the stop in at least one direction.

14. The stop assembly of claim 13, further comprising a flexible hose onto which the stop is mounted, wherein the bumper is configured to allow movement of the hose in the at least one direction in which the movement of the stop is constrained.

15. A method of mounting a stop on a flexible hose, comprising:
  providing the stop of claim 1 and a flexible hose;
  inserting the hose into the receiving channel;
  directing a first portion of the hose through the first transverse channel; and
  directing a second portion of the hose through the second transverse channel.

16. The method of claim 15, wherein the first portion of the hose is directed through the first transverse channel at approximately the same time as the second portion of the hose is directed through the second transverse channel.

17. The method of claim 15, wherein the first portion of the hose is directed through the first transverse channel at a different time than a time the second portion of the hose is directed through the second transverse channel.

18. A stop configured for mounting on a flexible hose for use in limiting travel of the hose into a hose reel, the stop comprising: a body with a hose passage formed therein, the hose passage comprising a receiving channel, a first transverse channel, a first retaining channel, a second transverse channel, and a second retaining channel, the first and second transverse channels being circumferentially offset from each other by an amount other than 180°, and wherein the hose passage across the receiving channel is aligned about a longitudinal axis of the stop, the first retaining channel is aligned about the longitudinal axis of the stop at the receiving channel and extends therefrom to a top end to define a first skew angle relative to the longitudinal axis of the stop and the second retaining channel is aligned about the longitudinal axis of the stop at the receiving channel and extends therefrom to a bottom end to define a second skew angle relative to the longitudinal axis of the stop.

19. The stop of claim 18, wherein the first transverse channel communicates with the first retaining channel and the second transverse channel communicates with the second retaining channel.

20. The stop of claim 19, wherein the receiving channel communicates with the first transverse channel and the first retaining channel generally in a first direction and the second transverse channel and the second retaining channel generally in a second direction opposite the first direction.

* * * * *